United States Patent

Minowa et al.

[11] Patent Number: 5,609,132
[45] Date of Patent: Mar. 11, 1997

[54] CONTROL APPARATUS AND METHOD FOR AN INTERNAL COMBUSTION ENGINE

[75] Inventors: Toshimichi Minowa, Tokai-mura; Minoru Ohsuga; Mineo Kashiwaya, both of Hitachinaka; Yasushi Sasaki, Urizura-machi, all of Japan

[73] Assignee: Hitachi, Ltd., Japan

[21] Appl. No.: 494,627

[22] Filed: Jun. 23, 1995

[30] Foreign Application Priority Data

Jun. 23, 1994 [JP] Japan .................................. 6-141394

[51] Int. Cl.$^6$ ...................................... F02B 31/00
[52] U.S. Cl. ............................... 123/306; 123/399
[58] Field of Search ............................ 123/188.14, 306, 123/308, 399

[56] References Cited

U.S. PATENT DOCUMENTS

| | | | |
|---|---|---|---|
| 4,112,885 | 9/1978 | Iwata et al. | 123/399 X |
| 4,413,598 | 11/1983 | Tsutsumi | 123/306 |
| 4,465,034 | 8/1984 | Tsutsumi | 123/306 |
| 4,753,200 | 6/1988 | Kawamura et al. | 123/306 X |
| 4,760,821 | 8/1988 | Aupor et al. | 123/308 |
| 4,858,567 | 8/1989 | Knapp | 123/276 |
| 5,190,008 | 3/1993 | Yamasaki et al. | 123/306 |

FOREIGN PATENT DOCUMENTS

| | | |
|---|---|---|
| 3704717 | 8/1987 | Germany . |
| 2-95730 | 4/1990 | Japan . |
| 6-101488 | 4/1994 | Japan . |

*Primary Examiner*—Tony M. Argenbright
*Attorney, Agent, or Firm*—Bardehle, Pagenberg, Dost, Altenburg, Frohwitter, Geissler and Partners

[57] ABSTRACT

The present invention has a structure of a lean-burn combustion engine 25 for burning a fuel by increasing the proportion of air to the fuel, a swirl control valve 8 for regulating a swirl intensity of combustion air inside an intake port in a lean-burn operation range of the lean-burn combustion engine 25, an accelerator pedal 1 for setting an acceleration request of a driver, and mechanical connection for mechanically connecting the accelerator pedal 1 to the swirl control valve 8, having a mechanism capable of setting the swirl control valve opening so that a lean limit can be expanded. Also, the invention has a structure of an intake system including the swirl control valve for regulating a swirl intensity of combustion air inside an intake port and a a driving mechanism for the valve can be produced easily and at a low cost, and a lean limit can be expanded.

18 Claims, 12 Drawing Sheets

RETURN SPRING k1

FIG. 9

RETURN SPRING k2

CONTROL APPARATUS AND METHOD FOR AN INTERNAL COMBUSTION ENGINE

FIELD OF THE INVENTION

This invention relates to a control apparatus and method for an internal combustion engine of a vehicle, particularly to a control apparatus and method for a lean-burn combustion engine of a vehicle.

BACKGROUND OF THE INVENTION

As a control apparatus and method for a lean-burn combustion engine according to the prior art, Japanese Patent Laid-Open No. 206822/1983 discloses a controller wherein a swirl control valve for regulating a swirl intensity of combustion air inside an intake port is provided in order to expand a lean limit, and this swirl control valve is driven by an actuator such as a diaphragm.

However, because the controller and the control method described above use the actuator for driving the swirl control valve, they do not consider the fitting space and the cost. As a result, they constitute an intake system having a complicated structure and requiring a high cost of production.

SUMMARY OF THE INVENTION

It is therefore an object of the present invention to provide a control apparatus and method for an internal combustion engine for driving a swirl control valve by simple driving means in consideration of the fitting space and cost of the swirl control valve driving means.

The above object described above can be accomplished by a control system which comprises the control apparatus for controlling a leanburn combustion engine for burning a fuel by increasing the proportion of air to the fuel and a swirl control valve for regulating a swirl intensity of combustion air inside an intake port in a lean-burn combustion operation range of the lean-burn combustion engine, an accelerator pedal for setting an acceleration request by a driver, and mechanical connection means for mechanically connecting the accelerator pedal and the swirl control valve. The mechanical connection means has a mechanism capable of setting an opening of the swirl control valve so that a lean limit can be expanded.

The control apparatus and method for the internal combustion engine according to the present invention have the construction described above. When the accelerator pedal is fully closed, the swirl control valve mechanically connected to the accelerator pedal is set to a swirl control opening capable of expanding the lean limit in the lean-burn operation range. When the accelerator pedal is pressed down to a lean-burn operation range of a partial load, a throttle valve for controlling the intake air quantity sucked into the engine is opened by a function of the accelerator pedal step-on quantity, but the swirl control valve is kept at the swirl control opening described above. When the accelerator pedal is stepped down to a power range outside the lean-burn operation range, the swirl control valve is opened by a function of the accelerator pedal step-on quantity. Accordingly, the lean burn limit can be expanded by the simple and economical swirl control valve driving means.

DETAILED DESCRIPTION OF THE PREFERRED EMBODIMENTS

Hereinafter, a speed change control method according to the present invention will be explained in detail with reference to the embodiments shown in the drawings.

Figure 1:
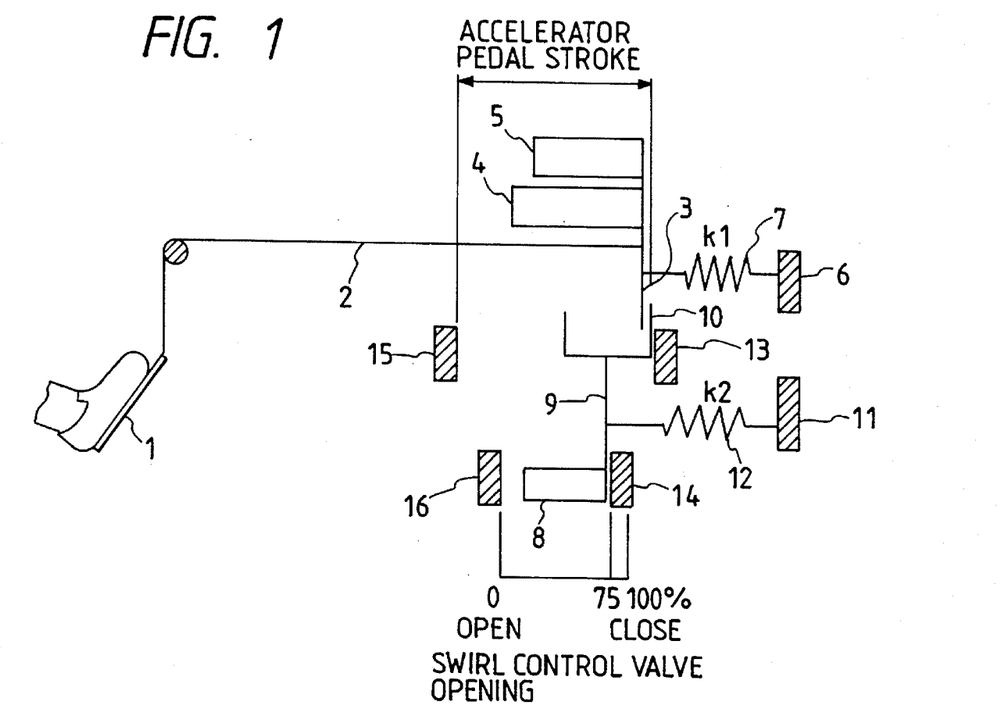
FIG. 1 shows a first embodiment of the present invention and an image of a construction of the control apparatus.

FIG. 1 shows a first embodiment of the present invention. An accelerator pedal 1 is mechanically connected to an acceleration lever 3 by a wire 2. The acceleration lever 3 is directly coupled to a throttle valve 4 for controlling the quantity of air sucked into the engine and to a throttle opening sensor 5. The acceleration lever 3 is also coupled directly to a return spring which is fitted to a fixed portion 6. When the accelerator pedal 1 is stepped on, therefore, the acceleration lever 3 operates, and a delay mechanism 10 connected to a swirl control valve 8 by mechanical means such as a wire 9 starts operating with a certain specific stroke. The delay mechanism 10 is directly coupled to a return spring 12 fitted to a fixed portion 11. When the acceleration stroke is zero (0), the acceleration lever 3 and the delay mechanism 10 are returned to a stopper 13 by the reaction of the return spring 7. The swirl control valve opening when the accleration stroke is zero (0) must be set in advance to the position of a stopper 14 in consideration of the lean limit. When the engine is not operated in lean-burn operation, the swirl control valve 8 moves from opening 75% to opening 0% (full opening). At lean-burn operation, the stopper 14 moves and an opening range of the swirl control valve 8 increases to 100% (full closing). The swirl control valve opening, which takes the lean air-fuel ratio limit into consideration, is kept in the lean air-fuel ratio range, and only after the delay mechanism 10, the swirl control valve 8 starts operating. The delay mechanism 10 and the swirl control valve 8 are limited by the stoppers 15 and 16, respectively, at the maximum acceleration stroke.

Figure 2:
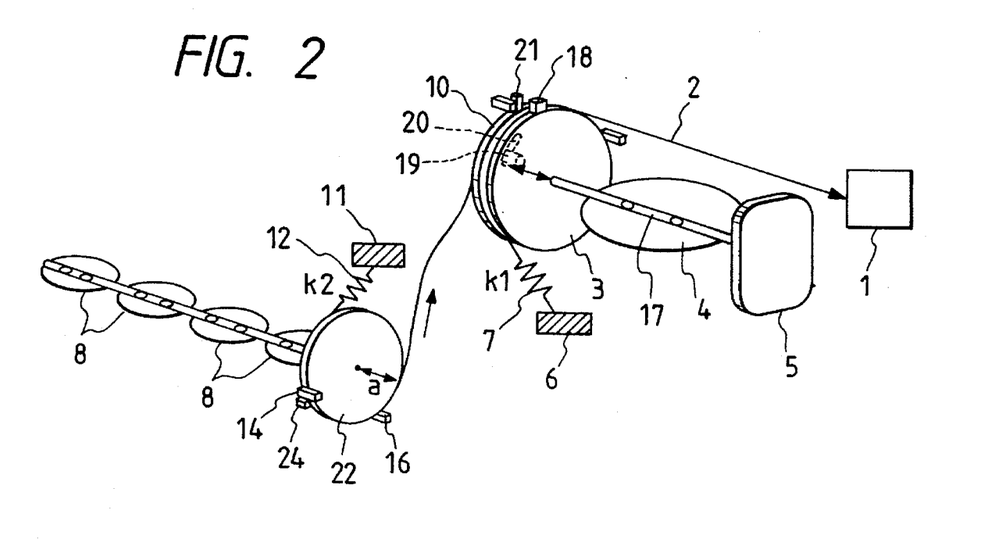
FIG. 2 shows a concrete construction of the first embodiment.

FIG. 2 shows the concrete construction of one embodiment. The acceleration lever 3 is rotated through the wire 2 when the accelerator pedal 1 is stepped. In consequence, the shaft 17 directly coupled to the acceleration lever 3 is rotated, too, and the throttle valve 4 and a rotary portion inside the throttle valve opening sensor 5 fitted to the shaft 17 operate. A shaft 18 for a full-open stopper is fitted on the circumference of the acceleration lever 3 and a shaft 19 for a delay mechanism is fitted on the left side of the shaft 18 at a position a radius a away from the center. The delay mechanism 10 has a groove 20 into which the shaft 19 for the delay mechanism is fitted, and has a shaft 21 for a full-closed stopper. The delay mechanism 10 is operated only by the operation of the shaft 19 for the delay mechanism, with the shaft 17 being the axis thereof. The swirl control lever 22 is operated by the operation of only the delay mechanism 10 interconnected to a wire 23. The fitting radius for the lever 22 and the wire 23 is a in the same way as the fitting position of the shaft 19 described above. Accordingly, the stroke of the accelerator pedal 1 can be brought into conformity with the stroke of the swirl control valve 8 while the delay is taken into consideration. A shaft 24 for a swirl control valve opening and for the full-open stopper for accomplishing the lean limit is fitted to the lever 22.

Figure 3:
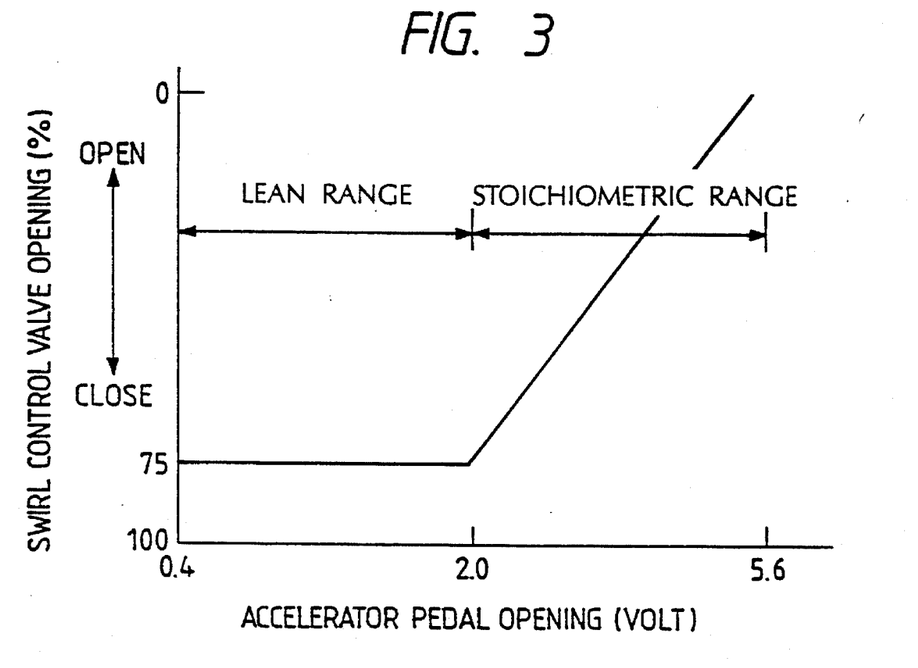
FIG. 3 is a relational diagram between an accelerator pedal angle and a swirl control valve opening.

FIG. 3 is a relational diagram between the accelerator pedal opening and the swirl control valve opening. The accelerator pedal opening means the accelerator pedal stroke shown in FIG. 1. When the accelerator pedal opening shown in FIGS. 1 and 2 is changed, it exhibits the characteristics shown in FIG. 3. For example, it will be assumed that a value of full closure of the accelerator pedal opening is 0.4 V, a value of its full opening is 5.6 V and a value of the operation start of the delay mechanism 10 is 2.0 V. At this time, the swirl control valve opening is kept at a value for securing the lean limit, such as 75%. In other words, the accelerator pedal opening of from 0.4 V to 2.0 V is the lean range, and from 2.0 V to 5.6 V is a stoichiometric ratio or rich range. Here, 0% represents the full open state of the swirl control valve and 100% does the full closure state.

Figure 4:
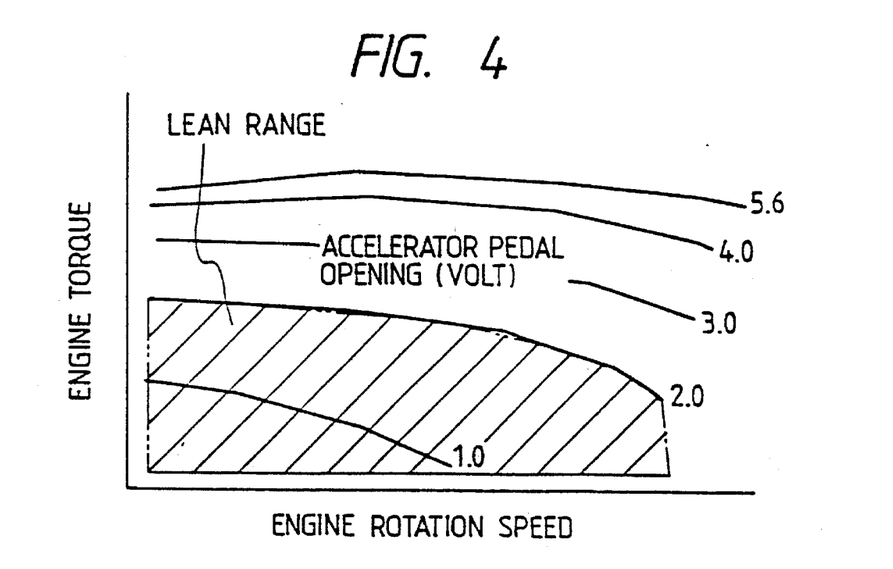
FIG. 4 is a characteristic diagram of the accelerator pedal angle of the engine.

FIG. 4 is a characteristic diagram of the accelerator pedal opening of the engine. FIG. 4 is prepared by plotting the engine rotation speed on the abscissa and an engine torque and the accelerator pedal opening which is coincident with the throttle valve opening, on the ordinate. The characteristics slant to the right at the accelerator pedal opening of FIG. 3, that is, from 1.0 V to 5.6 V in terms of the voltage value. The lean range shown in FIG. 3 corresponds to the hatched portion on this characteristic curve. When the lean operation range expands due to the improvement of the engine and combustion performance, the lean range can be further increased to a range where the accelerator pedal opening is greater.

Figure 5:
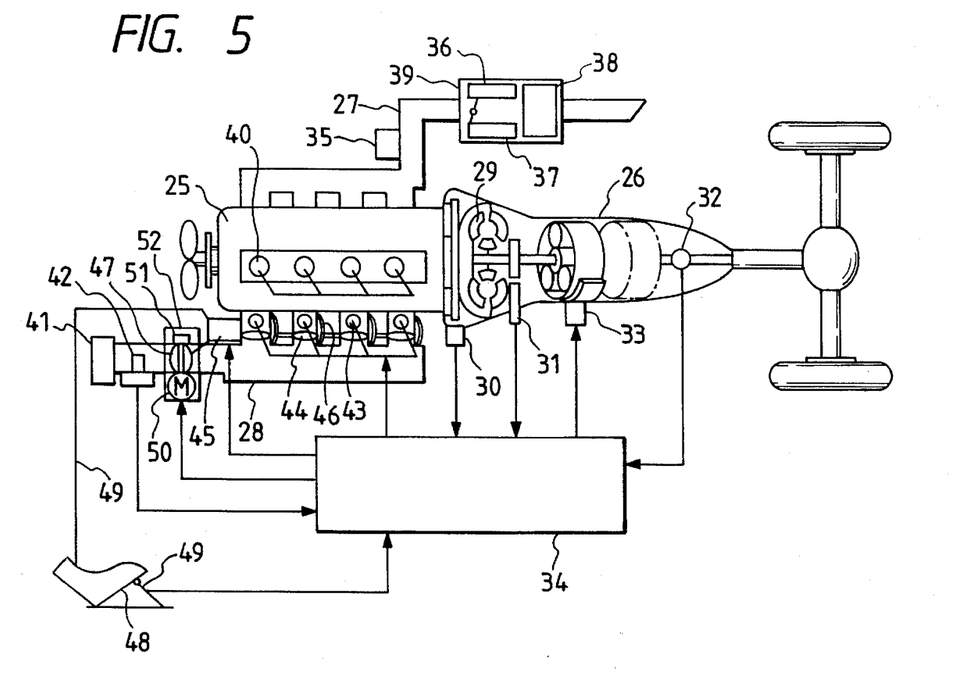
FIG. 5 shows the overall construction of a lean air-fuel ratio control system.

FIG. 5 shows the overall construction of the lean air-fuel ratio control system. A transmission 26, an exhaust pipe 27 and an intake pipe 28 are fitted to the lean-burn engine 25. An input shaft rotation sensor 30 of a torque convertor 29, an output shaft rotation sensor 31 of the torque convertor 29, a transmission output shaft rotation sensor 32 and an actuator 33 for controlling the transmission are provided to the transmission 26. The signals from these members are inputted and outputted to and from an engine power train control unit 34. An oxygen sensor (air-fuel ratio sensor) 35 and a catalyst system 39 comprising a HC-trap material 36, a NOx reduction catalyst 37 and a three-way catalyst 38 are provided to the exhaust pipe 27. An ignition device 40 is fitted to the lean burn engine 25. An air cleaner 41, an air quantity sensor 42, fuel injection valves 43, a swirl control valve 44 for generating the swirl for lean combustion, mechanical connection means 45 and a swirl control passage 46 are disposed in the intake pipe 28. The following two methods are available to control the throttle valve 47. The first directly drives the throttle valve 47 by the accelerator pedal 48 through a mechanical wire 49 and the other disposes an accelerator pedal opening sensor 49 in the accelerator pedal 48, inputs its signal to the engine power train control unit 34, and outputs the throttle opening calculated by this control unit 34 to a throttle controller 52 comprising the throttle valve 47, a motor 50 and the throttle opening sensor 51. The latter method is a so-called "electronically controlled throttle system". Flexibility of control can be improved by this electronically controlled throttle system. The mechanical connection means 45 described above includes the delay mechanism 10, etc, described already.

Figure 6:
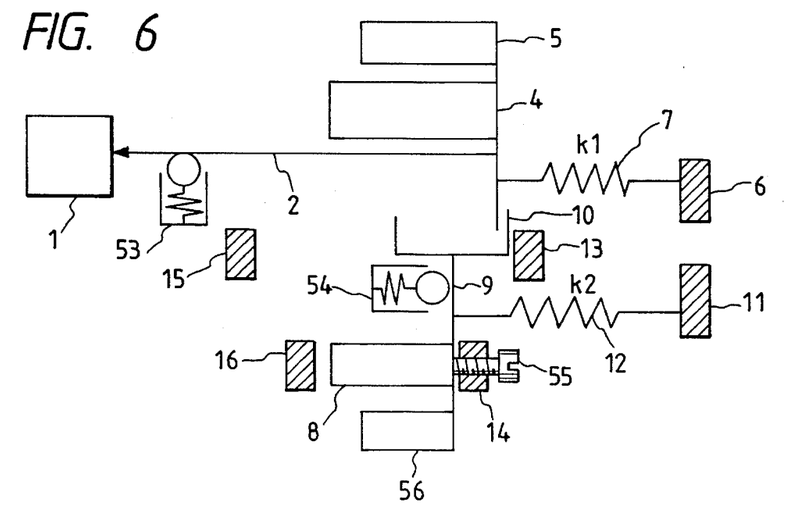
FIG. 6 shows the outline of a correction device for the mechanical error and change with time of a swirl control valve control mechanism.

FIG. 6 shows the outline of a correction device for correcting a mechanical error and the change with time of the swirl control valve control mechanism. The swirl control valve control mechanism shown in FIG. 1 involves the high possibility that the mechanical error during production and the change with time in the course of use for a long time occur. When the lean air-fuel ratio control is executed under the state where this mechanical error occurs, a difference occurs between the swirl control valve opening and the lean air-fuel ratio range, so that knocking, torque insufficiency and combustion unstability due to misfire are likely to occur. Therefore, the swirl control valve opening and the lean air-fuel ratio range must be always kept matched with each other. For example, there is the high possibility that the wires 2 and 9 extend due to the change with time, and the tensioners 53 and 54 must be provided, respectively. Also, the swirl control valve opening (for example, 75%) in lean combustion is important, and the initial opening of the swirl control valve must be controlled by fitting an adjustment screw 55 to the stopper. Another means disposes afresh a swirl control valve opening sensor 56, and the lean combustion operation range must be changed in match with the swirl control valve opening by feeding back the swirl control valve opening.

Figure 7:
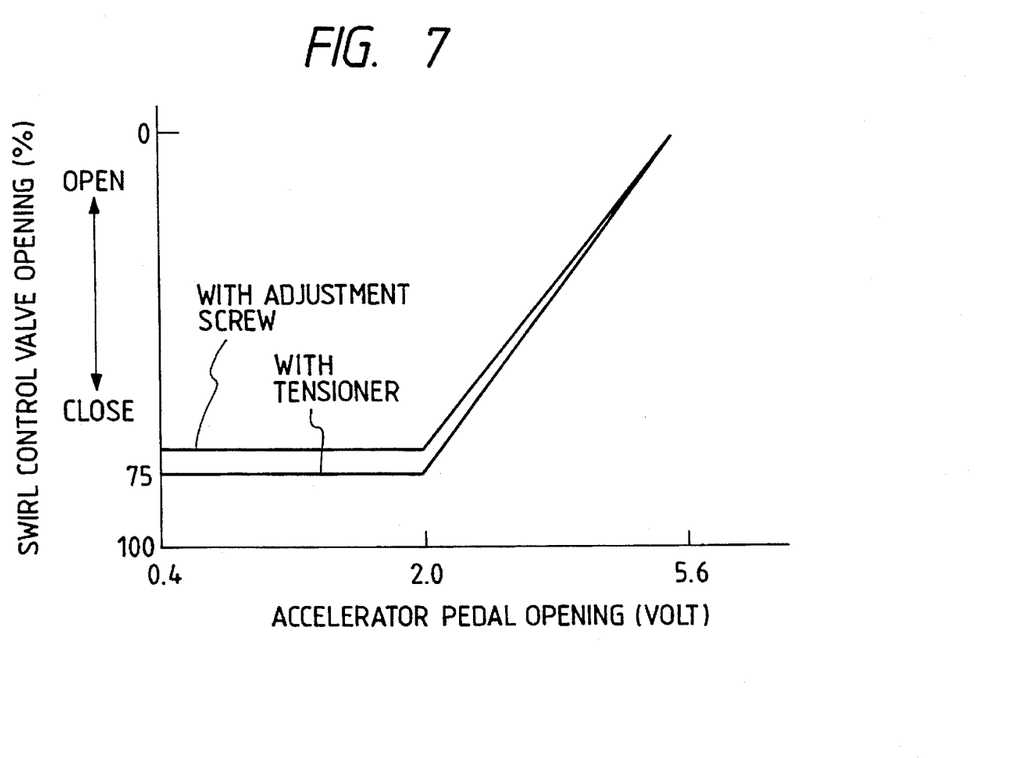
FIG. 7 shows swirl control valve opening characteristics when correction is made by the correction device shown in FIG. 6.

FIG. 7 shows the swirl control valve opening characteristics when correction is carried out by the correction device shown in FIG. 6. First, an importance is attached to the switch timing from the lean range to the stoichiometric range, and the case where the initial opening of the swirl control valve, that is, the opening necessary for accomplishing the lean limit, does not change will be considered. When the tensioner for correcting the extension of the wire is used, for example, the result similar to the initial characteristics can be obtained. In contrast, when only the adjustment screw is used, the change of the swirl control valve opening with respect to the accelerator pedal opening is different from the initial condition due to the extension of the wire. Accordingly, the initial opening of the swirl control valve should be changed in order to bring the changes in the lean and stoichiometric ranges into conformity. This problem can be solved by lowering a little the lean limit. Next, when correction for keeping the initial state is necessary, or in other words, when the switching timing from the lean range to the stoichiometric range as well as the opening necessary for accomplishing the lean limit are corrected, correction must be carried out by using both the tensioner and the adjustment screw.

Figure 8:
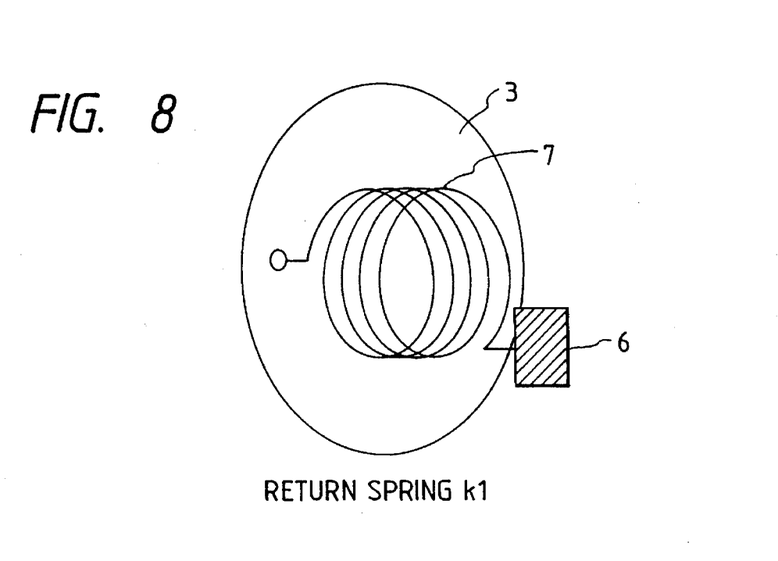
FIG. 8 shows the outline of a spring on the accelerator pedal side.
Figure 9:
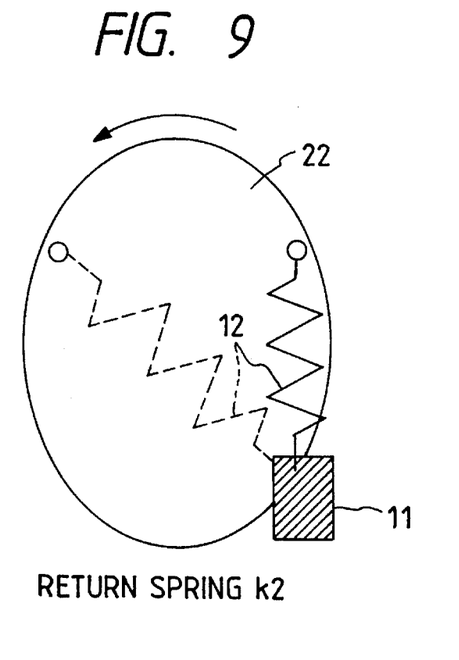
FIG. 9 shows the outline of a spring on the swirl control valve side.
Figure 10:
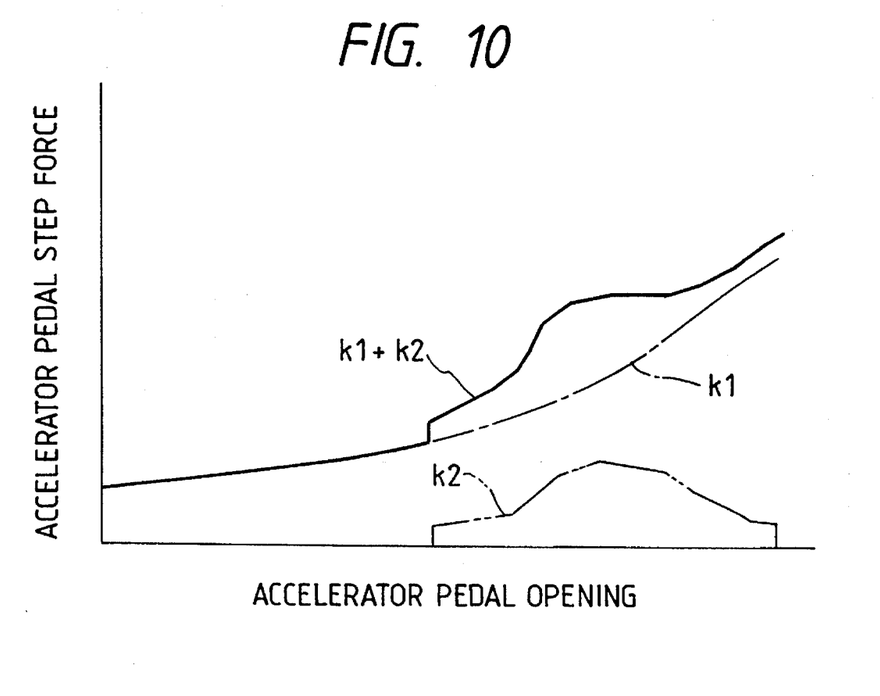
FIG. 10 shows the relation between an accelerator pedal angle and an accelerator pedal step force.

FIG. 8 shows the outline of the return spring on the accelerator side. FIG. 9 shows the outline of the return spring on the swirl control valve side. Since the swirl control valve control mechanism uses these two return springs, the reaction at the time of step-in of the accelerator pedal changes in accordance with the opening. This gives an unpleasant feeling to the driver. Therefore, the reaction of the return spring on the swirl control valve side must be reduced to minimum. FIG. 10 shows the relation between the accelerator pedal opening and the accelerator pedal step force. The accelerator pedal step force of the return spring 7 on the accelerator side is represented by a dash line having a constant k1. The contractive reaction increases in the rotating direction with the rotation of the acceleration lever 3, that is, with the increase of the accelerator pedal opening. The accelerator pedal step force of the return spring 12 on the swirl control valve side shown in FIG. 9 is represented by a dish line having a constant k2. The return spring 12 extends in the direction of the straight line with the rotation of the swirl control valve fever 12, that is, with the increase of the accelerator pedal angle, and after the reaction increases, it gradually drops. The sum of these two acceleration pedal step forces (solid line: k1+k2) is the reaction which is transmitted to the driver. The spring mechanism shown hereby provides the accelerator pedal step force having relatively less fluctuation.

Figure 11:
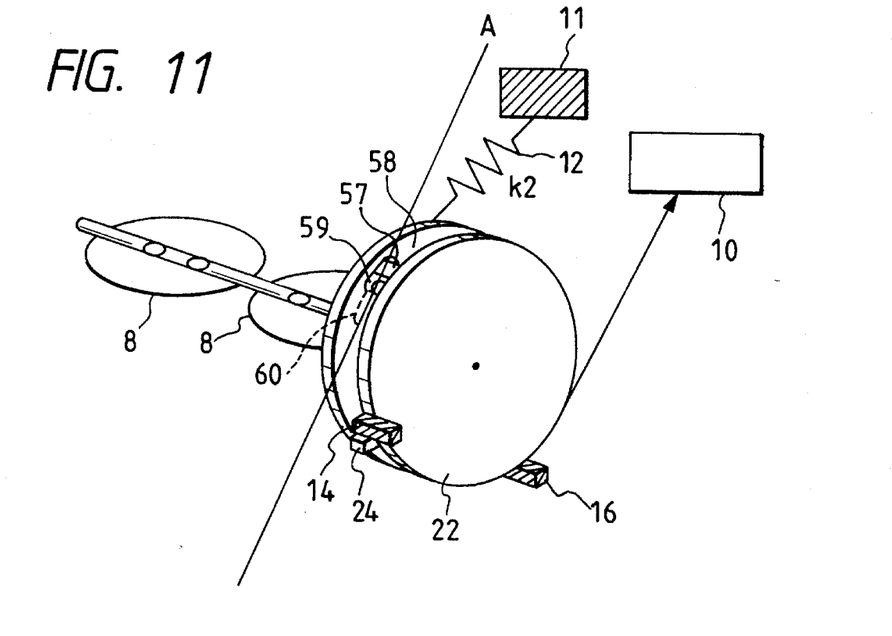
FIG. 11 shows an improved structure of a swirl control valve lever.
Figure 12:
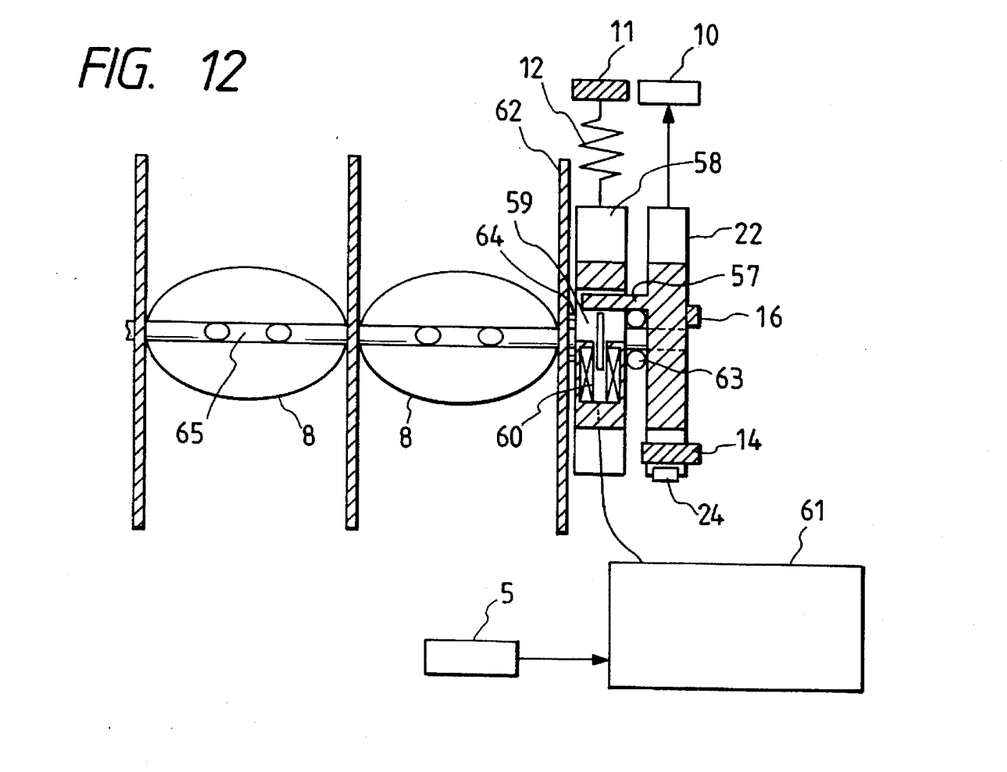
FIG. 12 is a sectional view of the improved structure shown in FIG. 11 along a line A–B.

FIG. 11 shows an improved structure of the swirl control valve lever. The drawing shows the structure wherein the swirl control valve opening is changed in two stages. The swirl control valve lever 22 is rotated by the delay mechanism 10 on the side of the accelerator pedal 3 through the wire 23. A shaft 57 for the delay mechanism on the side of the swirl control valve is fitted to the lever 22. A delay mechanism 58 on the side of the swirl control valve is provided with a groove 59 into which the shaft 57 for the delay mechanism fits, and with a return spring 12. The delay mechanism 58 has a built-in linear solenoid 60 for accomplishing the change of the second stage of the swirl control valve opening. Therefore, the swirl control valve 8 is operated by the shaft 57 for the delay mechanism and the linear solenoid 60. FIG. 12 is a sectional view of the improved structure shown in FIG. 11 along a line A-B. A throttle opening corresponding to an accelerator pedal opening is inputted to a control unit 61, and the linear solenoid 60 described above is controlled. This control method will be described later. Bearings 63 and 64 for reducing the turning force are disposed between the swirl control valve lever 22 and the delay mechanism 58 on the swirl control valve and between the delay mechanism 58 and the intake pipe 62, respectively. A swirl control valve shaft 65 is directly coupled with the delay mechanism 58. A bearing is interposed between the shaft 65 and the lever 22 and can freely rotate.

Figure 13:
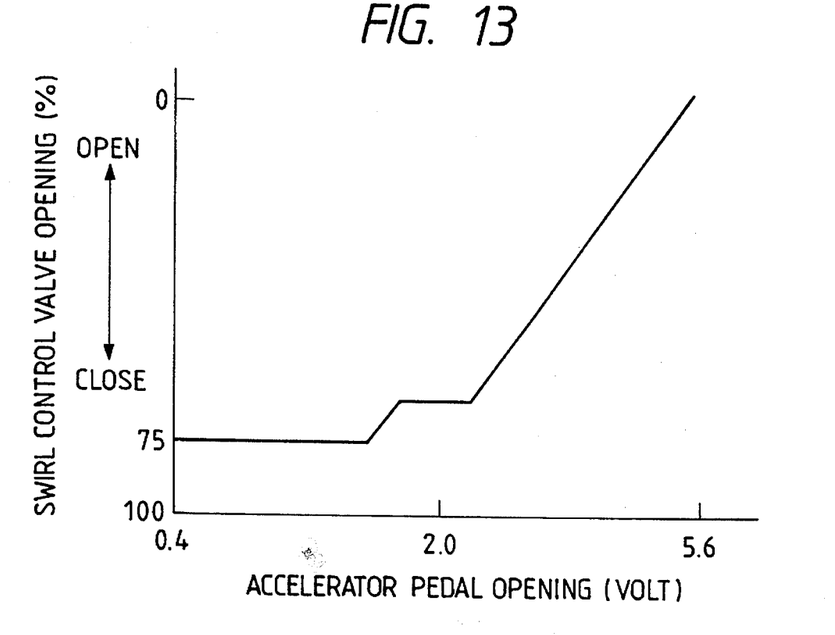
FIG. 13 shows two-stage the broken characteristics of the swirl control valve opening.

FIG. 13 shows two-stage folding characteristics of the swirl control valve opening. Because the linear solenoid 60 shown in FIG. 12 is used, various two-stage folding characteristics of the swirl control valve opening can be obtained. In this way, the swirl control valve opening which matches the lean limit can be set.

Figure 14:
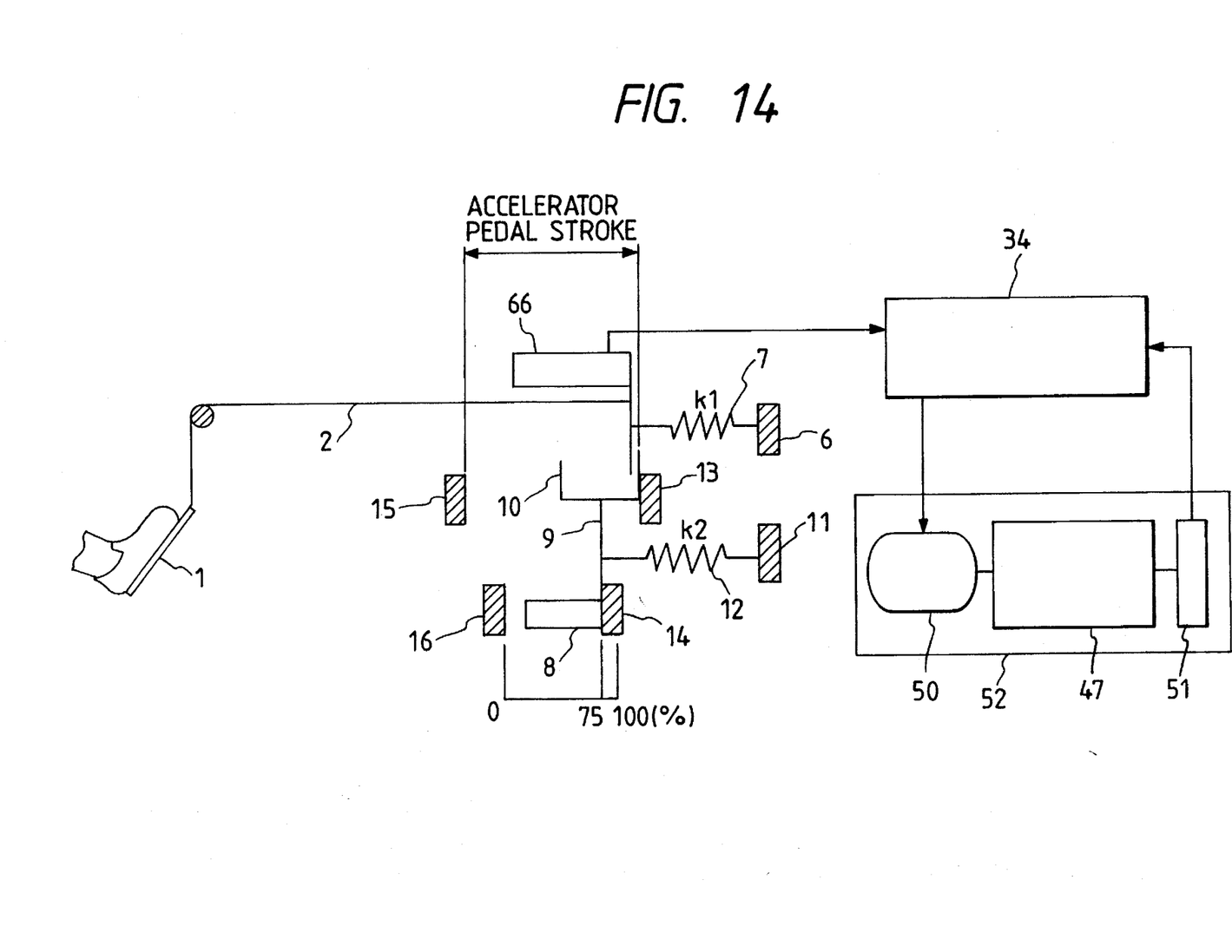
FIG. 14 shows an embodiment when using an electronic control throttle system.

FIG. 14 shows another embodiment which uses an electronic control throttle system. In the electronic control throttle system, a signal of the accelerator pedal opening is inputted from the accelerator pedal opening sensor 66 to the engine power train control unit 34 in accordance with the step quantity of the accelerator pedal 1, and a target throttle opening is calculated and outputted to the motor 50 for operating the throttle valve 47. The actual opening of the throttle valve 47 is detected by the throttle opening sensor 51 and is inputted to the control unit 34. The swirl control valve control mechanism is the same as the control mechanism when the electronic control throttle system is not used. The delay mechanism 10 and the wire 9 are operated in accordance with the step quantity of the accelerator pedal 1, and the swirl control valve 8 is so operated.

Figure 15:
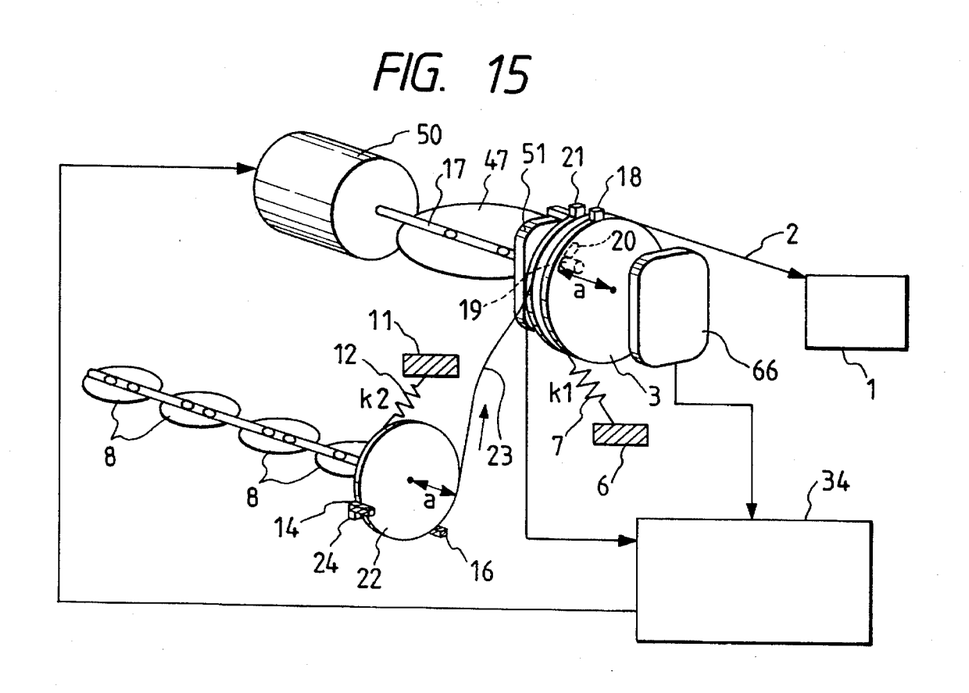
FIG. 15 shows a definite structure when the electronic control throttle system is used.

FIG. 15 shows the concrete construction when the electronic control throttle system is used. Since the swirl control valve control mechanism and the electronic control throttle system are explained with reference to FIGS. 2 and 14, respectively, their explanation will be omitted.

Figure 16:
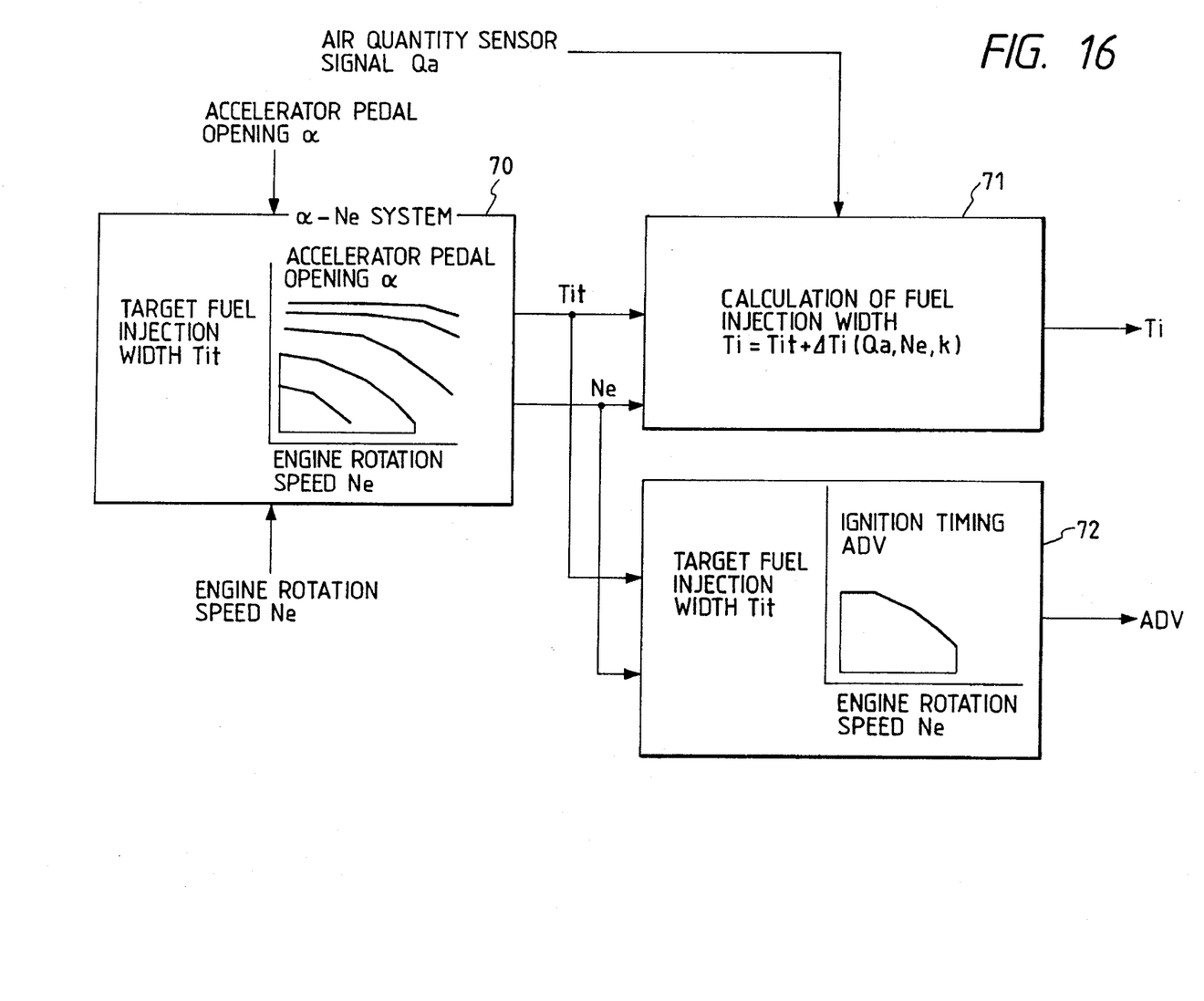
FIG. 16 is an engine control block without the electronic control throttle system.

FIG. 16 is an engine control block diagram when the electronic control throttle system is not used. First, a target fuel injection width Tit is calculated from the accelerator pedal opening $\alpha$ and the engine rotation speed Ne at step 70. This is generally referred to as the "$\alpha$-Ne system". Next, the flow proceeds to step 71, at which a correction injection width $\Delta$ Ti, which is determined by a function of the engine speed Ne, the correction constant k and the air quantity sensor signal Qa, is added to the injection width Tit described above, so as to calculate and output a fuel injection width Ti. At step 72, an ignition timing ADV is calculated and outputted from the engine rotation speed Ne and the injection width Tit. The range encompassed by a solid line is the lean burn range, and an ignition timing at the time of lean burn is stored. The ignition timing ADV similar to the one of the stoichiometric operation, that is, the present engine, is stored in other ranges.

Figure 17:
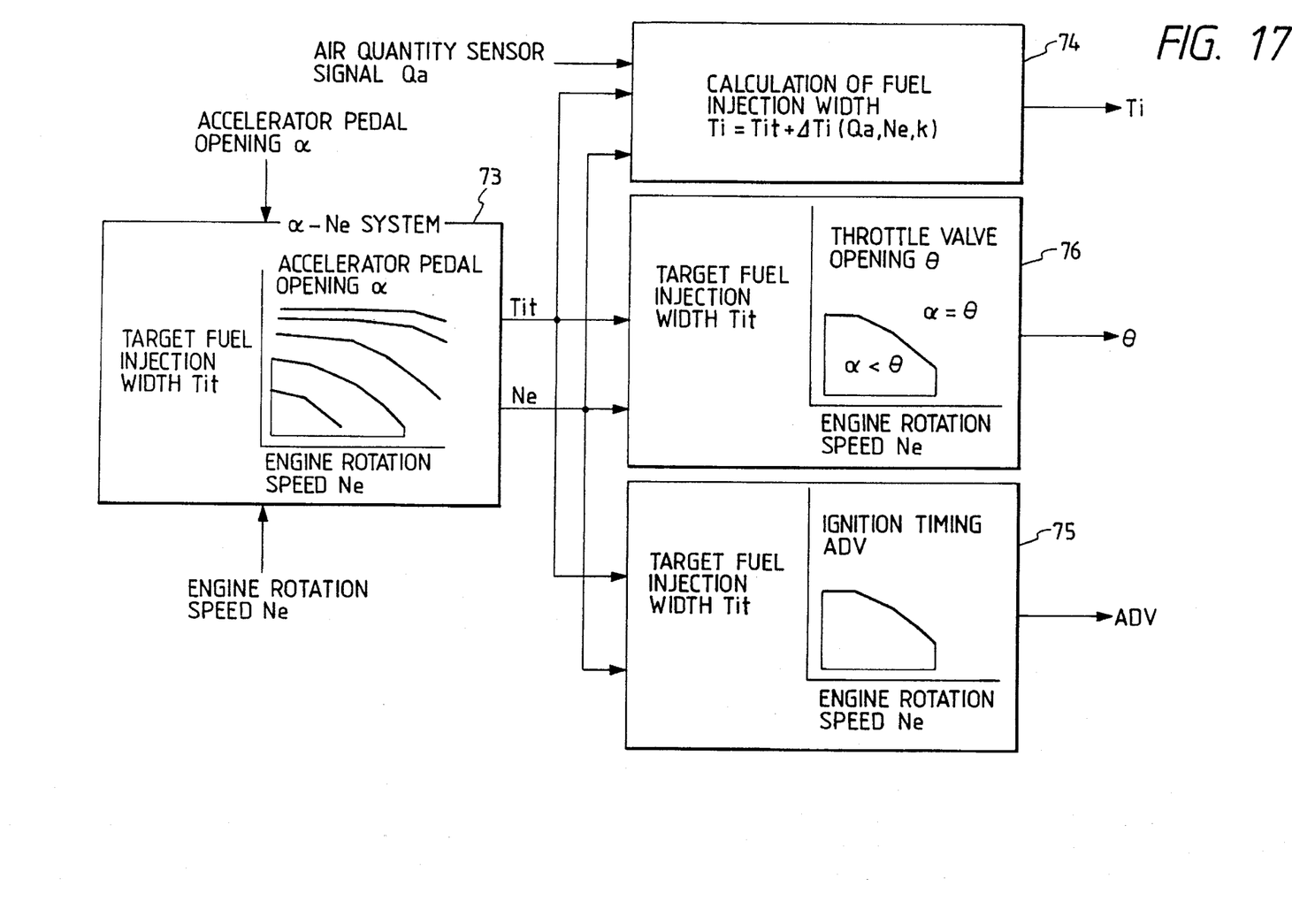
FIG. 17 is an engine control block diagram when the electronic control throttle system exists.

FIG. 17 shows the engine control block diagram when the electronic control throttle system exists. The fuel injection width Ti and the ignition timing ADV are the same as those shown in FIG. 16. Steps 73, 74 and 75 correspond to steps 70, 71 and 72, respectively. At step 76, the throttle opening $\theta$ is calculated and outputted from the engine rotation speed Ne and the injection width Tit. The region encompassed by the solid line is the lean burn range, and the throttle opening $\theta$ ($\alpha<\theta$: prevention of the torque drop at the time of lean burn) at the time of lean burn is stored. Since the throttle opening is the same as that of the stoichiometric range, that is, the present engine, in other ranges, $\alpha$ is set to be equal to $\theta$ ($\alpha=\theta$). Because fuel prior control becomes thus possible, the shock at the time of switch of the air-fuel ratio and acceleration response can be improved.

Figure 18:
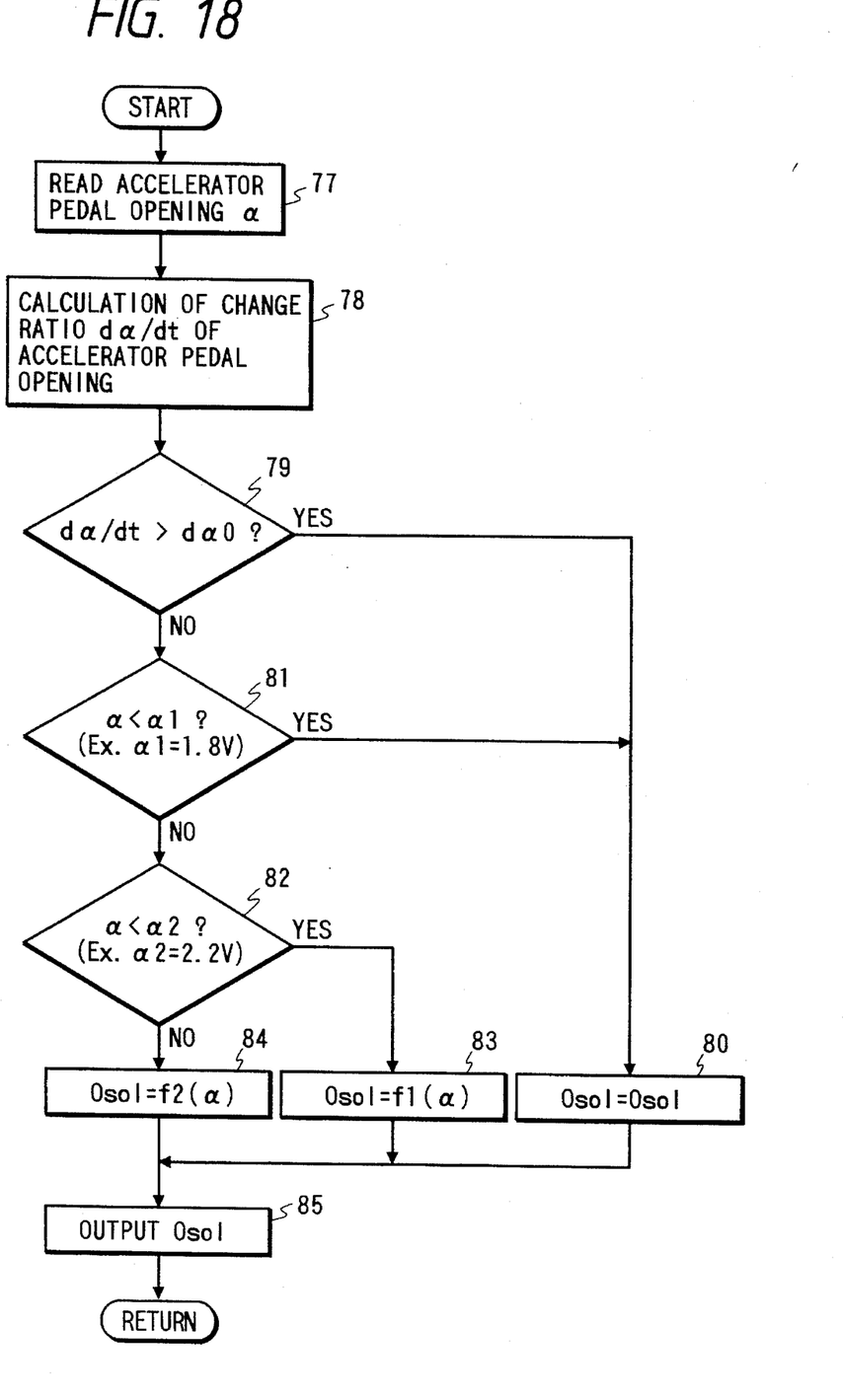
FIG. 18 is a control flowchart of a linear solenoid.

FIG. 18 is a flowchart of the linear solenoid. First, the accelerator pedal opening $\alpha$ is read at step 77. Next, the flow proceeds to step 78, at which the change ratio d $\alpha$/dt of the accelerator pedal opening is calculated. The flow then proceeds to step 79, and whether or not the change ratio d $\alpha$/dt is greater than an arbitrary constant d $\alpha$ o is judged. This step executes the judgement whether acceleration is slow acceleration or rapid acceleration. When the result of judgement proves Yes, that is, rapid acceleration, the flow proceeds to step 80, where the present solenoid displacement quantity Osol is held. At step 79, when the result of judgement proves No, that is, slow acceleration, the flow proceeds to step 81, and whether or not the accelerator pedal opening $\alpha$ is the maximum accelerator pedal opening $\alpha$ 1 of the first stage lean range is judged. When the result proves Yes, the delay control is executed on the accelerator lever side, so that the linear solenoid need not be operated and the flow proceeds to step 80. When the result of judgement is No, the flow proceeds to step 82 and whether or not the accelerator pedal opening α is the maximum accelerator pedal opening α 2 in the second stage lean range is judged. When the result of judgement proves Yes, the delay of the second stage lean range, that is, retention of the second stage swirl control vale opening, must be executed. Therefore, the solenoid displacement quantity Osol is calculated by the function f1 of the accelerator pedal opening α at step 83, and control corresponding to the change of the accelerator pedal opening is carried out. When the result of judgement proves No, the flow proceeds to step 84, the solenoid displacement quantity Osol is returned to the initial condition by using the function f2 of the accelerator pedal opening α so that the swirl control valve opening is opened fully. The solenoid displacement quantity Osol is outputted at step 85 and the flow returns. Accordingly, when the accelerator pedal opening is gradually increased or decreased, the swirl control valve opening changes as shown in FIG. 13, and when the former is rapidly opened to the stoichiometric range, the swirl control valve angle can be changed directly to the stoichiometric range with high response performance.

Figure 19:
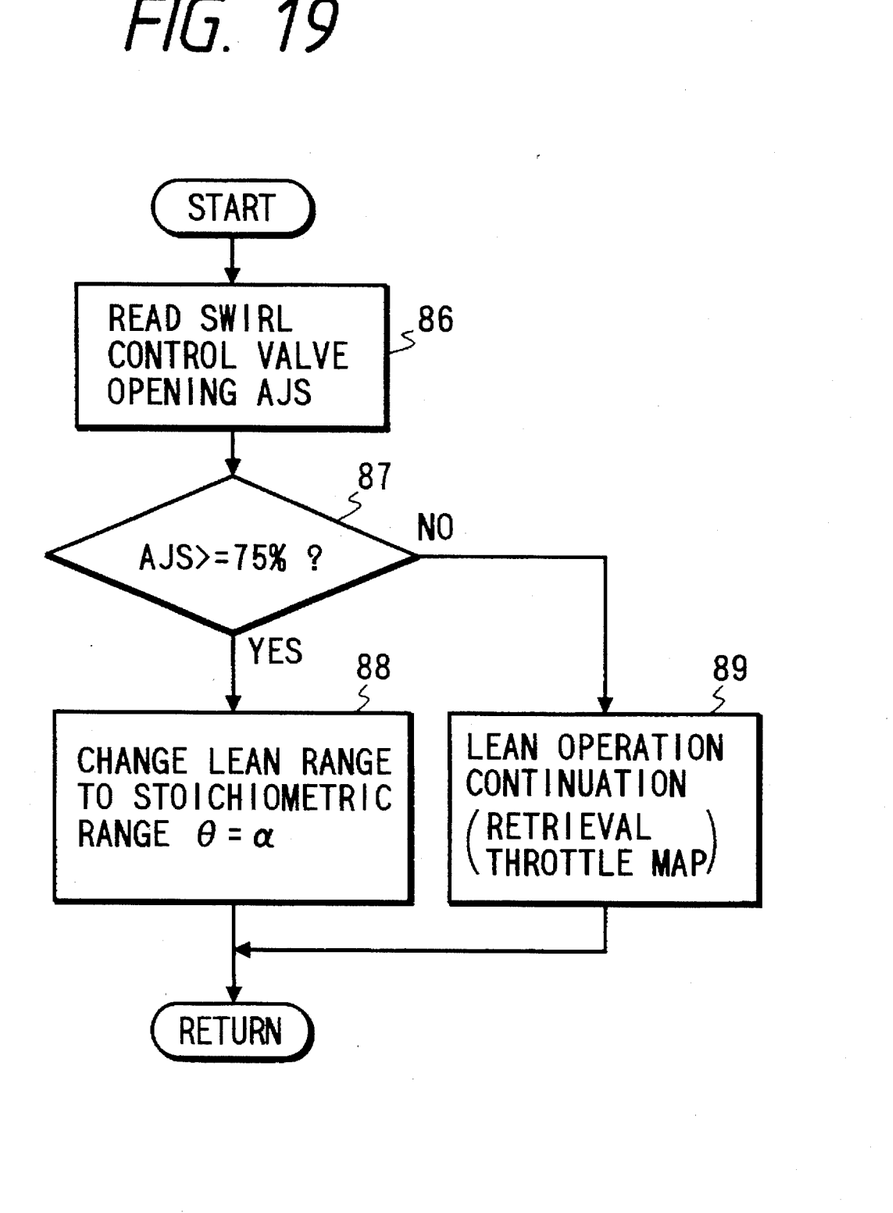
FIG. 19 is a control flowchart when an opening sensor is provided to the swirl control valve.

FIG. 19 shows the control flowchart when the opening sensor is provided to the swirl control valve. First, the swirl control valve opening AJS is read at step 86. Next, the flow proceeds to step 87 and whether or not the swirl control valve opening AJS described above reaches the lean limit of 75% is judged. When the result of judgement proves Yes, the flow proceeds to step 88. Because the lean limit changes, the lean range is changed to the stoichi-ometric range and the throttle opening θ is brought into conformity with the accelerator pedal opening α. When the result of judgement is No at step 87, the flow proceeds to step 89 and the present lean operation is continued (retrieval of throttle opening map for lean burn) and the flow returns.

The present invention can produce easily and economically an intake system including a swirl control valve for regulating a swirl intensity of combustion air inside an intake port and driving means for the swirl control valve, and can expand a lean limit.

What is claimed is:

1. A control apparatus for an internal combustion engine for controlling an output torque of said engine of a vehicle having an accelerator pedal for setting an acceleration request for the vehicle and said engine which is a lean-burn engine, comprising:

a swirl control valve for controlling a swirl intensity of an air into at least one intake port of said engine in a lean-burn condition; and a mechanical connection means for connecting said swirl control valve and said accelerator pedal wherein said mechanical connection means includes a delay mechanism keeping all opening of said swirl control valve in said lean-burn condition and an accelerator wire operating said delay mechanism by an operation of said accelerator pedal.

2. A control apparatus for an internal combustion engine according to claim 1, wherein said delay mechanism comprises a first lever on said accelerator pedal side and a second lever on said swirl control valve side.

3. A control apparatus for an internal combustion engine according to claim 2, further including a first return spring provided to said first lever and a second return spring provided to said second lever.

4. A control apparatus for an internal combustion engine according to claim 3, wherein said second return spring has a characteristic such that it extends in a linear direction and its reaction gradually decreases after it increases.

5. A control apparatus for an internal combustion engine according to claim 1, wherein said delay mechanism is provided with a two-stage delay mechanism.

6. A control apparatus for an internal combustion engine according to claim 5, wherein said two-stage delay mechanism is an actuator which is electrically controllable.

7. A control apparatus for an internal combustion engine for controlling an output torque of said engine of a vehicle having an accelerator pedal for setting an acceleration request for the vehicle and said engine which is a lean-burn engine, comprising:

a swirl control valve for controlling a swirl intensity of an air into at least one intake port of said engine in a lean-burn condition; anal a mechanical connection means for connecting said swirl control valve said accelerator pedal wherein said mechanical connection means includes correction means for correcting different individual characteristics and everchanging characteristics of elements of said vehicle.

8. A control apparatus for an internal combustion engine according to claim 7, wherein said correction means is composed of at least an adjustment screw or a tensioner, or their combination.

9. A control apparatus for an internal combustion engine according to claim 7, wherein said correction means compares an actual opening data output from an opening sensor detecting an actual opening of said swirl control valve with a calculated opening data of said swirl control valve calculated by a method using a lean-burn operation range and changes said calculated opening data to said actual opening data when both data are different.

10. A control method for an internal combustion engine for controlling an output torque of said engine of a vehicle having an accelerator pedal for setting an acceleration request for the vehicle and said engine which is a lean-burn engine, comprising the steps of: controlling a swirl intensity of an air into at least one intake port of said engine in a lean-burn condition using a swirl control valve which is connected to said accelerator pedal by a mechanical connection means; and a step of keeping an opening of said swirl control valve in said lean-burn condition using a delay mechanism which is included in said mechanical connection means and operated by the operation of said accelerator pedal.

11. A control method for an internal combustion engine according to claim 10, wherein said step of keeping an opening of said swirl control valve in said lean-burn condition further comprises a step of using a delay mechanism having a first lever on said accelerator pedal side and a second lever on said swirl control valve side.

12. A control method for an internal combustion engine according to claim 11, wherein said step of using a delay mechanism further comprises using a delay mechanism having a first return spring provided to said first lever and a second return spring provided to said second lever.

13. A control method for an internal combustion engine according to claim 12, wherein said step of using a delay mechanism further comprises using a second return spring which extends in a linear direction, and its reaction gradually decreases after it increases.

14. A control method for an internal combustion engine according to claim 10, wherein said step of keeping an opening of said swirl control valve in said lean-burn condition further comprises a step of using a delay mechanism which is provided with a two-stage delay mechanism.

15. A control method for an internal combustion engine according to claim 14, wherein said step of using a delay mechanism further comprises the step of using a two-stage delay mechanism comprising an actuator which is electrically controllable.

16. A control method for an internal combustion engine for controlling an output torque of said engine of a vehicle having an accelerator pedal for setting an acceleration request for the vehicle and said engine which is a lean-burn engine, comprising the steps of: controlling a swirl intensity of an air into at least one intake port of said engine in a lean-burn condition using a swirl control valve which is connected to said accelerator pedal by a mechanical connection means; and a step of correcting different individual characteristics and ever-changing characteristics of elements of said vehicle by using correction means provided with said mechanical connection means.

17. A control method for an internal combustion engine according to claim 16, wherein said step of correcting further comprises the step of using a correction means comprising at least an adjustment screw or a tensioner, or their combination.

18. A control method for an internal combustion engine according to claim 16, further comprising the steps of:

detecting an actual opening data of said swirl control valve;

calculating a calculated opening data of said swirl control valve required to place the engine in a lean-burn condition;

comparing said actual opening data with said calculated opening data; and changing said calculated opening data to said actual opening data when both data are different.

\* \* \* \* \*